United States Patent

Mallams

[15] 3,669,953

[45] June 13, 1972

[54] MEGALALOSAMINE AND ESTERS THEREOF AND METHODS FOR THEIR MANUFACTURE

[72] Inventor: Alan K. Mallams, West Orange, N.J.

[73] Assignee: Schering Corporation, Bloomfield, N.J.

[22] Filed: Oct. 13, 1969

[21] Appl. No.: 865,957

[52] U.S. Cl.....................260/210 AB, 424/180, 260/210 R
[51] Int. Cl.........................................................C07c 47/18
[58] Field of Search.............260/210 AB, 210 E, 210, 210 R

[56] References Cited

UNITED STATES PATENTS 3,318,866  5/1967  Hoeksema..........................260/210 R
3,380,994  4/1968  Nettleton............................260/210 R

OTHER PUBLICATIONS

Marquez et al. " The Journal of Antibiotics" Vol. XXII No. 6, June 1969, pp. 259–263

*Primary Examiner*—Lewis Gotts
*Assistant Examiner*—Johnnie R. Brown
*Attorney*—Stephen B. Coan and Mary S. King

[57] ABSTRACT

Megalalosamine and ester derivatives thereof and their pharmaceutically acceptable acid addition salts are novel macrolides exhibiting antibiotic activity.

Megalalosamine is prepared by treating one of megalomicin A, megalomicin B, megalomicin $C_1$ and megalomicin $C_2$, or mixtures thereof with aqueous acid. Megalalosamine 2',4''-diacylates and megalalosamine 3,2',4''-triacylates are prepared by treating megalalosamine in a basic medium with an acylating reagent of a hydrocarbon carboxylic acid or a hydrocarbon sulfonic acid. Megalalosamine 3-monoacylates are prepared by subjecting a megalalosamine 3,2',4''-triacylate to mild hydrolysis. Mixed 3,2',4''-triacylate esters of megalalosamine are prepared by treating one of megalalosamine, a 3-monoacylate thereof, or a 2',4''-diacylate thereof in a basic medium with an acylating reagent of a hydrocarbon carboxylic acid or a hydrocarbon sulfonic acid. 3-Tetrahydropyranyl-2',4''-diacylmegalalosamines are prepared by treating a megalalosamine 2',4''-diacylate with dihydropyran in the presence of acid.

14 Claims, No Drawings

MEGALALOSAMINE AND ESTERS THEREOF AND METHODS FOR THEIR MANUFACTURE

FIELD OF INVENTION

This invention relates to novel compositions of matter and to processes for their preparation.

More specifically, this invention relates to megalalosamine and esters thereof and their pharmaceutically acceptable acid addition salts which exhibit antibiotic properties. My invention also relates to methods for the preparation of megalalosamine and ester derivatives thereof and to intermediates produced thereby.

SUMMARY OF INVENTION

The invention sought to be patented in its composition of matter aspect resides in the concept of a chemical compound having a molecular structure comprising an erythronolide nucleus to which an O-β-D-desosaminyl moiety is attached at C-5 and an O-β-D-rhodosaminyl moiety is attached at C-11, said compound being megalalosamine, the chemical name of which is 5-O-(β-D-desosaminyl)-11-O-(β-D-rhodosaminyl)-erythronolide. Included in the composition of matter aspect of this invention are the 3-mono-, 2',40''-di-, and the 3,2',4''-triacylate esters of megalalosamine including esters of hydrocarbon carboxylic acids having up to 18 carbon atoms and hydrocarbon sulfonic acids having up to seven carbon atoms. Also included in the composition of matter aspect of this invention are the pharmaceutically acceptable acid addition salts of megalalosamine and the acylate esters thereof.

Generic chemical names of the megalalosamine mono-, di-, and triacylates of this invention are 5-O-(β-D-desosaminyl)-11-O-(β-D-rhodosaminyl)-3-acylerythronolide, 5-O-(2'-O-acyl-β-D-desosaminyl)-11-(4''-O-acyl-β-D-rhodosaminyl)-erythronolide and 5-O-(2'-O-acyl-β-D-desosaminyl)-11-O-(4''-O-acyl-β-D-rhodosaminyl)-3-acylerythronolide, respectively. In this specification and in the claims, the ester derivatives are preferably named according to standard rules of nomenclature as acyl derivatives of megalalosamine. For example, in the aforelisted chemical names of the esters of this invention, when "acyl" is "acetyl," the respective mono-, di-, and triester derivatives are named as 3-acetylmegalalosamine (or megalalosamine 3-acetate), 2',4''-diacetylmegalalosamine (or megalalosamine 2',4''-diacetate), and 3,2',4''-triacetylmegalalosamine (or megalalosamine 3,2',4''-triacetate), respectively.

The novel compositions of matter of this invention, i.e., megalalosamine, esters thereof, and their pharmaceutically acceptable acid addition salts possess antibiotic activity and, specifically, exhibit activity against organisms producing bacterial, malarial, coccidial, fungal, and schistosomal infections. Compounds of this invention wherein the 3-hydroxy group is substituted by either an ester or a 3-tetrahydropyranyl ether moiety possess greater antibiotic activity than the compounds of my invention possessing a free 3-hydroxy group, i.e., megalalosamine and the 2',4''-diester derivatives thereof. Of the foregoing preferred group of 3-substituted megalalosamines of this invention, the 3,2',4''-tri-hydrocarboncarbonyl megalalosamines (i.e., megalalosamine 3,2',4''-tri-hydrocarbon carboxylates) wherein the ester moiety has up to eight carbon atoms exhibit superior antibacterial activity over the 3-mono-acylmegalalosamines as well as over megalalosamine and the 2',4''-diacylmegalalosamines. The megalalosamine tri-hydrocarbon carboxylates having up to eight carbon atoms are, therefore, a particularly preferred species of the composition of matter aspect of this invention.

The invention sought to be patented in one process aspect of this invention resides in the concept of treating a member selected from the group of macrolides consisting of megalomicin A, megalomicin B, megalomicin C₁, megalomicin C₂, and mixtures of the foregoing, in an aqueous acidic medium whereby is produced megalalosamine. A preferred mode of this process aspect of my invention is that wherein the aqueous acidic medium is an aqueous mineral acid, particularly hydrochloric acid in a pH range of from about 0.1 to about 1.

The invention sought to be patented in another process aspect of my invention is that whereby the 2',4''-diacyl-megalalosamines (i.e., megalalosamine 2',4''-diacylates) are prepared and resides in the concept of treating megalalosamine in a basic medium at temperatures less than about 30° C. with an acylating reagent selected from the group consisting of an acid anhydride of a hydrocarbon carboxylic acid having up to 18 carbon atoms and an acyl halide of an acid selected from the group consisting of a hydrocarbon carboxylic acid having up to 18 carbon atoms and a hydrocarbon sulfonic acid having up to seven carbon atoms. Preferred modes of this process aspect are those wherein the basic medium is pyridine or wherein the basic medium is provided by an alkali metal bicarbonate in an inert solvent, e.g., sodium bicarbonate in acetone. In the latter case, the acylating reagent of choice is an acyl chloride or an acyl bromide of a hydrocarbon carboxylic acid having up to 18 carbon atoms or of a hydrocarbon sulfonic acid having up to seven carbon atoms.

The invention sought to be patented in a further process aspect of this invention is that whereby the 3,2',4''-triacylates of megalalosamine are prepared and resides in the concept of treating a member selected from the group consisting of megalalosamine, 3-acylmegalalosamine and 2',4''-diacyl-megalalosamine, said acyl being derived from an acid selected from the group consisting of a hydrocarbon carboxylic acid having up to 18 carbon atoms and a hydrocarbon sulfonic acid having up to seven carbon atoms, in a basic medium with an acylating reagent selected from the group consisting of an acid anhydride of a hydrocarbon carboxylic acid having up to 18 carbon atoms and an acyl halide derived from an acid selected from the group consisting of a hydrocarbon carboxylic acid having up to 18 carbon atoms and a hydrocarbon sulfonic acid having up to seven carbon atoms. As in the previous process aspect of this invention, preferred modes of this process are those wherein said basic medium is pyridine or wherein said basic medium is provided by an alkali metal bicarbonate in an inert solvent, e.g., sodium bicarbonate in acetone. In the latter case, the acylating reagent of choice is an acyl halide, particularly an acyl chloride and an acyl bromide, of a hydrocarbon carboxylic acid or of a hydrocarbon sulfonic acid. In this process aspect, by utilizing as starting compound either a 3-monoacylate or a 2',4''-diacylate of megalalosamine, there can be prepared mixed ester derivatives of my invention, i.e., 3,2',4''3 differs from the acyl group at C-2' and at C-4''.

The invention sought to be patented in another process aspect of this invention is that wherein the 3-monoacyl-megalalosamines of this invention are prepared and resides in the concept of subjecting to mild hydrolysis a 3,2',4''-triacyl-megalalosamine, said acyl being derived from an acid selected from the group consisting of a hydrocarbon carboxylic acid having up to 18 carbon atoms and a hydrocarbon sulfonic acid having up to seven carbon atoms. Preferred mild hydrolysis conditions comprise treating a 3,2',4''-triacylmegalalosamine with an alcoholic-aqueous alkali metal carbonate solution (e.g., methanolic-aqueous potassium bicarbonate).

The invention sought to be patented in another aspect of this invention resides in the concept of treating a 2',4''-diacyl-megalalosamine with dihydropyran in the presence of acid whereby is formed a 3-tetrahydropyranyl-2',4''-diacyl-megalalosamine of this invention, said acyl being derived from an acid selected from the group consisting of hydrocarbon carboxylic acids having up to 18 carbon atoms and a hydrocarbon sulfonic acid having up to seven carbon atoms.

GENERAL DESCRIPTION OF THE INVENTION

COMPOSITION OF MATTER ASPECT

Included among the physical embodiments of the composition of matter aspect of this invention as defined hereinabove are macrolides selected from the group consisting of megalalosamine, ester derivatives thereof, and pharmaceutically acceptable acid addition salts of the foregoing, said macrolides being members selected from the group consisting of a compound having the following structural formula I:

For convenience, the stereo configuration of megalalosamine and esters thereof will be disclosed throughout the specification and claims in a planar fashion as set forth in Formula I hereinabove, although the stereo configuration may also be depicted as shown below in Formula I':

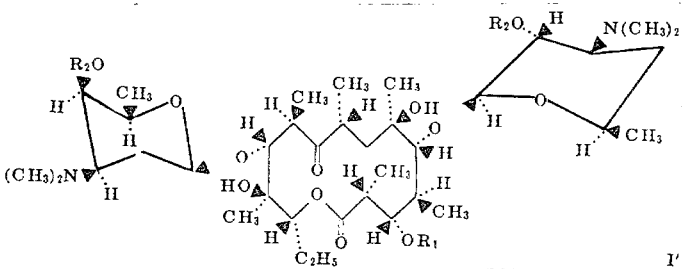

I'

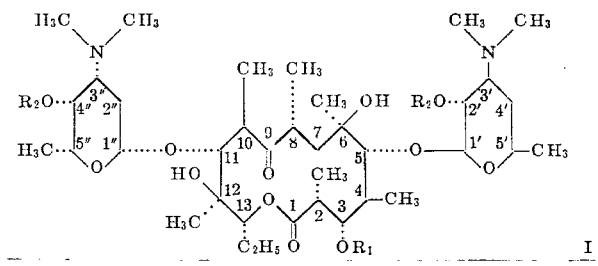

I wherein $R_1$ is a member selected from the group consisting of hydrogen, tetrahydropyranyl, and an acyl radical of an acid selected from the group consisting of a hydrocarbon carboxylic acid having up to 18 carbon atoms and a hydrocarbon sulfonic acid having up to seven carbon atoms; and $R_2$ is a member selected from the group consisting of hydrogen and an acyl radical of an acid selected from the group consisting of a hydrocarbon carboxylic acid having up to 18 carbon atoms and a hydrocarbon sulfonic acid having up to seven carbon atoms; and the pharmaceutically acceptable salts of the foregoing compounds of structural Formula I.

The acyl radicals are derived from hydrocarbon carboxylic acids containing up to 18 carbon atoms and may be saturated, unsaturated, straight chain or branched chain aliphatic, cyclic, cyclic-aliphatic, aromatic, aryl-aliphatic, or alkyl-aromatic, and may be substituted by hydroxy, alkoxy containing from one to five carbon atoms or by halogen such as fluorine, chlorine or bromine. Typical ester groups of the megalalosamine derivatives of this invention are thus derived from hydrocarbon carboxylic acids such as alkanoic acids, including formic, acetic, propionic, trimethylacetic, butyric, isobutyric, ter.-butyric, valeric, iso-valeric, caproic, caprylic, capric, undecylic, lauric, myristic, palmitic and stearic acids; substituted alkanoic acids such as phenoxyacetic, trifluoroacetic, and β-chloropropionic acids; aromatic and substituted aromatic acids including benzoic, toluic, p-chlorobenzoic acids; aralkanoic acids such as phenylacetic and phenylpropionic acids; unsaturated acids such as acrylic, sorbic, and linolenic acids; and dibasic acids such as succinic, tartaric and phthalic acids. Also contemplated as included within the acyl radicals defined as $R_1$ and $R_2$ in compounds of structural Formula I hereinabove are esters derived from hydrocarbon sulfonic acids having up to seven carbon atoms including methanesulfonic acid, benzenesulfonic acid, and p-toluenesulfonic acid.

The compound of Formula I, wherein both of $R_1$ and $R_2$ are hydrogen, is megalalosamine which also may be identified by the chemical name 5-(0-β-D-desosaminyl)-11-(O-β-D-rhodosaminyl)-erythronolide. The carbon atoms in the compounds of Formula I are thus numbered in accordance with the conventional procedure used for macrolide derivatives, carbons 1 to 13 of the erythronolide aglycone being as shown above in Formula I, the carbon atoms in the desosamine moiety at C-5 and in the rhodosamine moiety at C-11 being given prime and double prime numbers as indicated above.

Also included within the composition of matter aspect of this invention are acyl ester derivatives of megalalosamine as defined by Formula I including 3-mono-acylmegalalosamines (i.e., compounds wherein $R_1$ is an acyl radical and $R_2$ is hydrogen) such as 3-acetylmegalalosamine (also named as megalalosamine 3-acetate) and 3-propionylmegalalosamine; 2',4''-diacylmegalalosamines (i.e. compounds wherein $R_1$ is hydrogen and $R_2$ is an acyl radical) such as 2',4''-diacetylmegalalosamine and 2',4''-dibenzoylmegalalosamine; 3-tetrahydropyranyl-2',4''-diacylmegalalosamines (i.e., compounds wherein $R_1$ is tetrahydropyranyl and $R_2$ is acyl) such as 2',4''-dibenzoyl-3-tetrahydropyranylmegalalosamine; and 3,2',4''-triacylmegalalosamine (i.e. compounds wherein $R_1$ and $R_2$ may be the same or different acyl radicals) such as 3,2',4''-triacetylmegalalosamine, 3,2',4''-tripropionylmegalalosamine, 3,2',4''-tri-isovalerylmegalalosamine, 2',4''-diacetyl-3-propionylmegalalosamine, 2',4''-diacetyl-3-isovalerylmegalalosamine, 2',4''-dibenzoyl-3-caproylmegalalosamine, 2',4''-diacetyl-3-methanesulfonylmegalalosamine and 2',4''-dibenzoyl-3-methanesulfonylmegalalosamine.

The physical embodiment of the compounds of this invention as defined by formula I, i.e., megalalosamine, 3-acyl-megalalosamines, 2',4''-diacylmegalalosamines, and 3,2',4''-triacylmegalalosamines, are characterized by being white amorphous powders which are soluble in most polar organic solvents including halogenated hydrocarbons, e.g., chloroform and carbon tetrachloride, and nitrogen substituted hydrocarbons, e.g., pyridine and dimethylformamide, and in non-polar cyclic ethers, e.g., dioxane and tetrahydrofuran, and which are insoluble in water, and have a limited solubility in most non-polar organic solvents including hydrocarbons (e.g., benzene, hexane, and the like) and alkyl ethers (e.g., ethyl ether).

Included in the composition of matter aspect of this invention are pharmaceutically acceptable acid addition salts of megalalosamine and esters thereof as defined by Formula I which can be made, according to known procedures, by neutralizing the free base with the appropriate acid to below about pH 7.0 and, advantageously, to about pH 2 to pH 6. Suitable acids for this purpose are such as hydrochloric, sulfuric, phosphoric, thiocyanic, fluorosilic, hexafluoroarsenic, hexafluorophosphoric, acetic, succinic, citric, camphoric, glutaric, glycolic, phthalic, tartaric, lauric, stearic, salicylic, 3-phenylsalicylic, 5-phenylsalicylic, 3-cyclopentylpropionic, 1,2-cyclohexanedicarboxylic, 4-cyclohexanecarboxylic, octadecenylsuccinic, octenylsuccinic, dimethyldithiocarbamic, cyclohexylsulfamic, hexadecylsulfamic, octadecylsulfamic, sorbic, monochloroacetic, undecylenic, 4'-hydroxy-azobenzene-4-sulfonic, octyldecylsulfuric, picric, benzoic, cinnamic and like acids.

The physical embodiments of the acid addition salts of megalalosamine and esters thereof as defined by Formula I are characterized by being white crystalline solids which are soluble in water and alcohols, e.g., methanol, ethanol, and the like, and are insoluble in most polar and non-polar organic solvents.

The macrolide compounds of the composition aspect of my invention as defined by Formula I, i.e., megalalosamine, 3-acylmegalalosamine, 2',4''-diacylmegalalosamine, 3,2',4''-triacylmegalalosamine including the pharmaceutically acceptable acid addition salts thereof, all exhibit a broad spectrum antibiotic activity in vitro against a variety of gram positive bacteria (e.g. *staphylococcus aureus*, staph. 11631, staph. W, *streptococcus pyogenes* C, *strep. pyogenes* C-203 and *bacillus subtilis*), gram negative bacteria (e.g., *escherichia coli*, *salmonella schottmeulleri* and *pseudomonas aeruginosa*). My compounds are thus useful to clean and sterilize laboratory glassware and surgical instruments, and may also be used in combination with soaps, detergents, and wash solutions for sanitation purposes as in the washing of hands, and in the cleaning and sanitizing of hospital rooms and areas used for food preparation such as kitchens, dining halls and the like.

By way of illustration, shown below in Table I are the in vitro antibacterial spectrum of megalalosamine and typical ester derivatives thereof against typical gram-positive and gram-negative organisms. The susceptibility of the test organisms to the antibiotics was determined by a tube dilution assay in yeast beef broth adjusted to pH 8.0 with sodium hydroxide.

Megalalosamine (compound of formula I wherein $R_1=R_2=H$), while exhibiting antibacterial activity as shown in Table I, is useful mainly as an intermediate in the process aspects of this invention whereby are prepared the ester derivatives of this invention, all of which demonstrate superior antibiotic activity to that of the parent hydroxy compound.

A preferred group of compounds of this invention are those in which the hydroxyl group at C-3 is substituted by either an acyl or a tetrahydropyranyl group including the 3-monoacyl-megalalosamines (compounds of Formula I wherein $R_1$ is acyl and $R_2$ is hydrogen, e.g., 3-acetylmegalalosamine), the 3,2',4''-triacylmegalalosamines (compounds of Formula I wherein $R_1$ and $R_2$ are acyl, e.g., 2',4''-dibenzoyl-3-methanesulfonylmegalalosamine and 3,2',4''-triacetylmegalalosamine) and the 2',4''-diacyl-3-tetrahydropyranylmegalalosamines (compounds of Formula I wherein $R_1$ is tetrahydropyranyl and $R_2$ is acyl, e.g., 2',4''-dibenzoyl-3-tetrahydropyranylmegalalosamine). As demonstrated by the data set forth hereinabove in Table I, the 3-acylated and the 3-tetrahydropyranylmegalalosamines possess superior antibiotic activity against a broad range of both gram positive and gram negative bacteria and against fungi when compared to megalalosamine and the 2',4''-diester thereof. Of the foregoing, those exhibiting more enhanced antibacterial activity in general, are the 3,2',4''-trisubstituted megalalosamines wherein the acyl radicals have less than eight carbon atoms, e.g., 2',4''-dibenzoyl 3-methanesulfonylmegalalosamine, 2',4''-dibenzoyl-3-tetrahydropyranylmegalalosamine, and 3,2',4''-triisovalerylmegalalosamine. Of this group, those possessing a 3-propionate are a preferred species, e.g., 3,2',4''-tripropionylmegalalosamine, and 2',4''-diacetyl-3-propionylmegalalosamine.

The 2',4''-diacylmegalalosamine derivatives of my invention as exemplified by 2',4''-dibenzoylmegalalosamine and 2',4''-diacetylmegalalosamine, while demonstrating greater activity than megalalosamine against both gram positive and gram negative organisms, are most useful as intermediates in preparing the more active mixed 3,2',4''-triacylates, a preferred species of my invention, e.g., 2',4''-diacetyl-3-propionylmegalalosamine and 2',4''-dibenzoyl-3-methanesulfonylmegalalosamine, by one of the processes of this invention as described hereinbelow.

In addition to the foregoing, megalalosamine and esters thereof as defined by Formula I hereinabove are useful as intermediates in the preparation of another group of macrolides having antibiotic properties, namely 9-dihydromegalalaosamine and esters thereof which are described in my copending application, Ser. No. 865,956, filed concurrently herewith, entitled 9-Dihydromegalalosamine And Esters Thereof And Methods For Their Manufacture. Thus, for example, megalalosamine

TABLE I

Minimal inhibitory concentration (mcg./ml.)

| | Megalalosamine | 3-acetylmegalalosamine | 3-propionylmegalalosamine | 2',4''-dibenzoyl megalalosamine | 2',4''-diacetyl megalalosamine | 2',4''-diacetyl-3-methanesulfonyl-megalalosamine | 2',4''-dibenzoyl-3-methanesulfonyl-megalalosamine | 2',4''-dibenzoyl-3-tetrahydropyranyl-megalalosamine | 3,2',4''-triacetyl-megalalosamine | 3,2',4''-tripropionyl-megalalosamine | 3,2',4''-triisovaleryl-megalalosamine | 2',4''-diacetyl-3-propionyl-megalalosamine |
|---|---|---|---|---|---|---|---|---|---|---|---|---|
| *Staphylococcus aureus* ATCC 11631 | >25 | 3.0 | 7.5 | >25 | | 17.5 | 3.0 | 3.0 | >25 | 3.0 | 7.5 | 0.75 |
| *Streptococcus pyogenes* C-203 | >25 | 3.0 | 7.5 | >32 | | 17.5 | 7.5 | 0.75 | >25 | 0.75 | 6.0 | 0.75 |
| *Staphylococcus aureus* 2001 | >25 | 7.5 | 7.5 | >25 | | 17.5 | 3.0 | 0.75 | >25 | 0.75 | 7.5 | 0.75 |
| *Staphylococcus aureus* W | >25 | 3.0 | 7.5 | >25 | | 17.5 | 7.5 | 3.0 | >25 | 3.0 | 6.0 | 0.75 |
| *Streptococcus pyogenes* 3 | | 3.0 | | | | | 3.0 | | | | | |
| *Streptococcus pyogenes* 6 | | 3.0 | | | | | 17.5 | | | | | |
| *Streptococcus pyogenes* C | >25 | | >25 | >32 | | >25 | 3.0 | 3.0 | >25 | 3.0 | 7.5 | 0.75 |
| *Escherichia coli* Sc | >25 | 17.5 | | 12 | | >25 | 3.0 | | >25 | | 17.5 | 3.0 |
| *Salmonella schottmuelleri* 2A | >25 | 17.5 | >25 | | | >25 | | | | | | 17.5 |
| *Pseudomonas aeruginosa* 621 | | 17.5 | | | | | | 3.0 | | 17.5 | | |
| *Escherichia coli* Me F | | 17.5 | | | | | 7.5 | | | | | |
| *Escherichia coli* 9 | | 17.5 | | | | | 17.5 | | | | | |
| *Salmonella schottmuelleri* 830 | | 17.5 | | 3.0 | | | 7.5 | 3.0 | | | | |
| *Pseudomonas aeruginosa* 656 | | 17.5 | | | | | 17.5 | | | | | |
| *Pseudomonas aeruginosa* 8089 | | 17.5 | | | | | 7.5 | | | | | |
| *Proteus mirabilis* | | 17.5 | | | | | 7.5 | | | | | |
| *Proteus vulgaris* 1 | | 17.5 | | | | | 7.5 | | | | 3.0 | |
| *Klebsiella pneumoniae* 432 | | 17.5 | | | | | 7.5 | | | | 3.0-6.0 | |
| *Klebsiella pneumoniae* 845 | | 17.5 | | | | | 7.5 | | | | 3.0-6.0 | | upon treatment with sodium borohydride in isopropanol, is converted to 9-dihydromegalalosamine (a compound of Formula I wherein $R_1$ and $R_2$ are hydrogen and wherein the 9-keto function is changed to a 9(S)-hydroxy function) possessing greatly enhanced antibacterial activity over that of megalalosamine. Similarly, when a 3-acyl-, a 2',4''-diacyl-, or a 3,2',4''-triacylmegalalosamine of formula I, e.g., 3-propionylmegalalosamine, 2',4''-dibenzoylmegalalosamine or 3,2',4''-tripropionylmegalalosamine, is reduced with an alkali metal borohydride in an inert solvent, e.g., sodium borohydride in dioxane, there is obtained the corresponding 9-dihydromegalalosamine derivative, e.g., 3-propionyl-9-dihydromegalalosamine, 2',4''-dibenzoyl-9-dihydromegalalosamine, and 3,2',4''-tripropionyl-9-dihydromegalalosamine, respectively, which exhibit antibacterial activity.

The 3,2',4''-triacylmegalalosamines of this invention are also useful as intermediates in preparing 3-monoacylmegalalosamines of Formula I which, in turn, serve as intermediates for preparing mixed 3,2',4''-triacylmegalalosamines having enhanced antibiotic activity. Thus, for example, 3,2',4''-tripropionylmegalalosamine, upon mild hydrolysis with methanolic-aqueous sodium bicarbonate solution at 25° C. according to a process aspect of my invention, will yield 3-monopropionylmegalalosamine which, upon treatment with acetic acid anhydride in pyridine according to another process aspect of this invention, will yield the mixed ester, 2',4''-diacetyl-3-propionylmegalalosamine which has enhanced antibacterial activity over that exhibited by the starting tripropionylmegalalosamine.

The acid addition salts of the composition of matter aspect of this invention, e.g., 3-acetylmegalalosamine ditartarate and the 3-acetylmegalalosamine dihydrochloride, can be used for the same biological purpose as the free bases as defined by Formula I, e.g., 3-acetylmegalalosamine. Alternatively, the acid addition salts can be used as a means to further purify the free base megalalosamines by conversion thereof to an acid addition salt according to known techniques; then, after isolation and purification of the crystalline acid addition salt or solution thereof, regenerating the free base megalalosamine derivative by treatment with alkali.

FIRST PROCESS ASPECT OF THE INVENTION

Megalalosamine, the compound of Formula I wherein $R_1$ and $R_2$ are hydrogen, is prepared by the process aspect of this invention whereby a macrolide selected from the group consisting of megalomicin A, megalomicin B, megalomicin $C_1$, megalomicin $C_2$, or mixtures thereof, is hydrolyzed in an aqueous acidic medium.

Suitable acids for this first process aspect of my invention include hydrocarbon carboxylic acids such as acetic, propionic, phthalic and tartaric acids as well as mineral acids, such as hydrochloric, sulfuric, phosphoric, and nitric acids. Preferred acids for use in my process are aqueous mineral acids, particularly sulfuric and hydrochloric acids.

The hydrolysis is usually carried out at a pH below 4 and preferably is carried out at a pH less than 1. Reaction media in the range of from about pH 0.4 to about 0.8 have been found to be most effective in producing good yields of megalalosamine of pure quality.

The process of hydrolyzing a member of the megalomicin macrolide family in an aqueous acidic medium is usually carried out at temperatures below 100° C. and preferably in the range of from about 25° C. to about 100° C. I prefer to carry out this process at about 25° C. in an aqueous mineral acid (preferably hydrochloric acid) at a pH range of from about 0.1 to about 1.0.

In a preferred species of the physical embodiment of this process, megalomicin A is hydrolyzed at 25° C. for 20 hours in 0.75 Normal hydrochloric acid (pH = 0.15). The megalalosamine thereby produced is then conveniently isolated by neutralizing the reaction medium with excess solid sodium bicarbonate, extracting the reaction mixture with chloroform, and concentrating the chloroform extracts to a residue followed by precipitation thereof from benzene-hexane.

The starting compounds of this process, i.e., megalomicin A, megalomicin B, megalomicin $C_1$, megalomicin $C_2$ and mixtures thereof (also known as Antibiotic W847–A, Antibiotic W847B, Antibiotic W847$C_1$, Antibiotic W847$C_2$, and Antibiotic W847; respectively are known compounds and are prepared according to known procedures by the cultivation under submerged aerobic conditions of *micromonospora megalomicea* var. *megalomicea* NRRL 3274 and *micromonospora megalomicea* var. *nigra* NRRL 3275 of the order Actinomycetales. The physical constants and properties of the starting compound of the megalomicin series are described in the literature and in copending application Ser. No. 855,424 filed Sept. 4, 1969, of Marvin J. Weinstein, George M. Luedemann, Gerald H. Wagman, and Joseph A. Marquez for Antibiotic W847 (Megalomicin) And Methods For Production Thereof. The starting megalomicins of my invention are defined by the following structural Formula II:

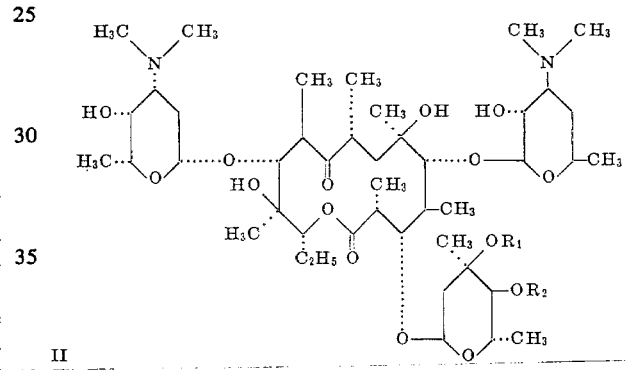

II wherein $R_1$ is a member selected from the group consisting of hydrogen and acetyl; and $R_2$ is a member selected from the group consisting of hydrogen, acetyl and propionyl.

Megalomicin A is a compound of Formula II wherein $R_1 = R_2 =$ hydrogen; megalomicin B is a compound of Formula II wherein $R_1 =$ hydrogen and $R_2 =$ acetyl; megalomicin $C_1$ is a compound of formula II wherein $R_1 = R_2 =$ acetyl; and megalomicin $C_2$ is a compound of formula II wherein $R_1$ is acetyl and $R_2$ is propionyl, and megalomicin (Antibiotic W847) is a mixture of the four components A, B, $C_1$, and $C_2$.

In carrying out my process whereby a member of the megalomicin complex or mixtures thereof are hydrolyzed in aqueous acid to produce megalalosamine, I have found that when megalomicin A is used as starting compound, better yields of the product are obtained within a shorter reaction time than when megalomicin B, $C_1$, $C_2$, or mixtures thereof are used as starting compounds. Accordingly, megalomicin A is the starting compound of choice in this process aspect of my invention.

It is surprising that upon hydrolysis of the macrolides of the megalomicin family with aqueous acid according to my process, there is split off but one sugar moiety at C–3 to produce L-mycarose and megalalosamine (compound of Formula I wherein $R_1$ and $R_2$ are hydrogen) in which the original aglycone remains intact and contains two sugar substituents, i.e., the D-desosamine at C–5 and the D-rhodosamine at C–11. Heretofore, upon hydrolysis of other macrolide antibiotics, e.g., erythromycin A, and erythromycin C, under aqueous acidic conditions similar to those utilized in my process, all but one of the sugar groups have been split off, and there has been rearrangement of the macrolide structure in which the original aglycone forms a spiroketal having only the D-desosaminyl moiety at C–5, e.g., the compound erythralosamine.

2',4''-DIACYL PROCESS ASPECT OF THE INVENTION

The 2',4''-diacylmegalalosamines of Formula I wherein $R_1$ = H and $R_2$ = acyl are prepared by the process aspect of this invention whereby megalalosamine is esterified at temperatures less than about 30° C. in a basic medium with an acylating reagent selected from the group consisting of an acid anhydride of a hydrocarbon carboxylic acid and an acyl halide derived from an acid selected from the group consisting of a hydrocarbon carboxylic acid having up to 18 carbon atoms, and a hydrocarbon sulfonic acid having up to seven carbon atoms.

The necessary acylating reagents for this process, i.e. acid anhydrides of hydrocarbon carboxylic acids having up to 18 carbon atoms and acyl halides of hydrocarbon carboxylic acids having up to 18 carbon atoms and of hydrocarbon sulfonic acids having up to seven carbon atoms, are known compounds and may be prepared utilizing procedures known in the art. Of the acyl halides, those usually employed are the more readily available acyl chlorides and acyl bromides of hydrocarbon carboxylic acids having up to 18 carbon atoms and hydrocarbon sulfonic acids having up to seven carbon atoms.

Among the basic media contemplated as suitable for use in this process are tertiary aliphatic and aromatic amines including cyclic amines having a boiling point in the range of from about 70° to about 115° C., e.g., triethylamine and, preferably, pyridine, which serve both as solvent and basic agent. Also suitable as basic media for this process are alkali metal bicarbonates (preferably sodium bicarbonate) and alkali metal carbonates (e.g., sodium carbonates) in the solid state suspended in a non-hydroxylated solvent inert to the acylating reagent, e.g., dioxane, tetrahydropyran and, preferably, acetone. Of the foregoing, pyridine is the basic medium of choice when the acylating reagent is an acid anhydride, e.g., acetic anhydride, propionic anhydride, isovaleric anhydride; and sodium bicarbonate in acetone is the basic medium of choice when the acylating reagent is an acyl halide, preferably an acyl chloride or an acyl bromide, such as methanesulfonyl chloride, p-toluenesulfonyl chloride, benzoyl chloride, caproyl chloride and stearoyl chloride. In general, any acid anhydride, acyl chloride or acyl bromide of a hydrocarbon carboxylic acid having up to 18 carbon atoms and any acyl chloride or acyl bromide of a hydrocarbonsulfonic acid having up to seven carbon atoms may be used in this process aspect of my invention, and there will be obtained the 2',4''-diacyl esters of Formula I.

A convenient method of carrying out the physical embodiment of a preferred species of this process, i.e., that which utilizes an acid anhydride in pyridine as the basic acylating medium, comprises preparing a solution of megalalosamine in dry pyridine to which has been added an acid anhydride, e.g. acetic anhydride, in amounts greater than two moles anhydride per mole of megalalosamine, and allowing this solution to stand at room temperature (about 25° C.) overnight (usually about 16 hours). The 2',4''-diacylmegalalosamine, e.g. 2',4''-diacetylmegalalosamine, is then conveniently isolated as substantially the sole product and purified utilizing techniques known in the art such as solvent extraction, precipitation, crystallization, chromatography and the like. I have found, even when using large excesses of acid anhydride per mole of megalalosamine, that by carrying out the esterification reaction at low temperatures, e.g., below 30° C., the reaction virtually stops after the more reactive 2'- and 4''-hydroxyl groups are esterified, and there are obtained good yields of 2',4''-diacylmegalalosamine of good purity.

Similarly, a convenient method of carrying out the physical embodiment of another preferred species of this process aspect, i.e., that which utilizes an acyl halide of a hydrocarbon carboxylic acid (e.g., benzoyl chloride) as the acylating agent and an alkali metal bicarbonate (e.g., sodium bicarbonate) in an inert solvent, (e.g., acetone) as the basic medium, comprises preparing a solution of megalalosamine in acetone to which has been added solid sodium bicarbonate, and then adding an acyl halide, e.g., benzoyl chloride, in amounts in excess of two moles of acid halide per mole of megalalosamine and the reaction mixture stirred at room temperature overnight (about 16 hours) and there is formed good yields of 2',4''-dibenzoylmegalalosamine, of good purity which is easily isolated by filtering the reaction mixture, adding ammonium hydroxide to the acetone solution, and filtering the resulting white solid, a 2',4''-diester which can be further purified utilizing known techniques, e.g., column chromatography followed by crystallization of the eluate residue.

Due to the greater reactivity of a hydrocarbon sulfonyl halide to that of a hydrocarbon carbonyl halide, when utilizing a hydrocarbon sulfonyl chloride, e.g., methanesulfonyl chloride, in this species of my process for preparing 2',4''-diacylmegalalosamines, e.g., 2',4''dimethanesulfonyl-megalalosamines, in order to obtain a product having a minimum of triester impurity present, it is necessary to keep the reaction temperature below room temperature and to add at most two moles of hydrocarbonsulfonyl halide (e.g., methanesulfonylchloride) per mole of megalalosamine at a slow rate while monitoring the reaction mixture (such as by thin layer chromatograms of aliquots of reaction mixture) at set intervals so that the reaction may be stopped as soon as the triester derivative (e.g., 3,2',4''-trimethanesulfonyl-megalalosamine) starts to form.

3,2',4''-TRIACYL PROCESS ASPECT OF THE INVENTION

The 3,2',4''-triacylmegalalosamines of Formula I wherein $R_1$ and $R_2$ are acyl radicals are prepared by this process aspect which resides in the concept of treating a member selected from the group consisting of megalalosamine, 3-acylmegalalosamine, and 2',4''-diacylmegalalosamine, said acyl being derived from an acid selected from the group consisting of a hydrocarbon carboxylic acid having up to 18 carbon atoms and a hydrocarbon sulfonic acid having up to seven carbon atoms, in a basic medium with an acylating reagent selected from the group consisting of an acid anhydride of a hydrocarbon carboxylic acid and an acyl halide of an acid selected from the group consisting of a hydrocarbon carboxylic acid and a hydrocarbon sulfonic acid having up to seven carbon atoms.

The requisite starting compounds for this process, i.e., megalalosamine, 2',4''-diacylmegalalosamine, and 3-acylmegalalosamine, are prepared by processes described and claimed herein.

The acylating reagents and the basic mediums contemplated as suitable for this process aspect are the same as those described hereinabove for the 2',4''-diacyl process aspect. Preferred species for carrying out this process are those wherein the esterification is carried out in pyridine utilizing as acylating reagent either an acid anhydride of a hydrocarbon carboxylic acid or an acyl halide of a hydrocarbon sulfonic acid, as well as those wherein esterification is carried out in an inert solvent, e.g., acetone, in the presence of an alkali metal bicarbonate, e.g., sodium bicarbonate, utilizing as acylating reagent an acyl halide of acids selected from the group consisting of hydrocarbon carboxylic acids and of hydrocarbon sulfonic acids.

The particular reaction conditions employed in this process aspect can vary depending upon the starting compound, acylating reagent, and basic medium employed. When utilizing megalalosamine as starting compound, a preferred method of carrying out the physical embodiment of this process is to heat a solution of megalalosamine in pyridine with a large molar excess of an acid anhydride (e.g., acetic anhydride, propionic anhydride, and isovaleric anhydride) at elevated temperatures in the range of from about 70° C. to about 115° C. overnight (usually about 16 hours) and there is formed excellent yields of 3,2',4''-triacylmegalalosamine (e.g., 3,2',4''-triacetylmegalalosamine, 3,2',4''-tripropionylmegalalosamine, and 3,2',4''-tri-isovalerylmegalalosamine) which is isolated utilizing conventional techniques such as by solvent extraction, precipitation, and chromatographic techniques. When carrying out this mode of my process, in general, the higher the temperature employed, the faster is the rate of reaction and the greater is the yield of 3,2',4''-triester. While 3,2',4''-triacylmegalalosamine forms at temperatures below 70° C., the rate of reaction is exceedingly slow since, even though the 3,2'- and 4''-hydroxyl groups are all secondary hydroxyl groups, the 2',4''-diacylmegalalosamine derivatives form first, even at lower temperatures, and, unless forcing conditions are employed, such as by utilizing heat, the more hindered 3-hydroxyl function will be esterified at an extremely slow rate.

When utilizing a 2',4''-diacylmegalalosamine (e.g., diacetylmegalalosamine or dibenzoylmegalalosamine) as starting compound to prepare a mixed ester derivative of this invention, and, specifically, when introducing a hydrocarbon carboxylic acid ester at C-3 such as a 3-propionate, or a 3-caproate, both preferred modes of this process are conveniently employed. Thus, for example, when a solution of diacetylmegalalosamine in pyridine to which is added more than a molar excess of propionic anhydride, is heated at reflux (about 115° C.) overnight (around 16 hours) according to my process, there is formed 2',4''-diacetyl-3-propionylmegalalosamine, a preferred compound of this invention.

Alternatively, when n-caproylchloride is added to a mixture of dibenzoylmegalalosamine and solid sodium bicarbonate in acetone and the mixture is heated at reflux on a steam bath for several days (sixteen), there is obtained 2',4''-dibenzoyl-3-caproylmegalalosamine, another preferred compound of this invention. In this reaction, by substituting a non-hydroxylated solvent having a higher boiling point than acetone, e.g., dioxane, the rate of reaction is increased, and the desired 3,2',4''-triester formed in a shorter time than with acetone. When carrying out modes of this process aspect wherein the rate of reaction is slow, the progress of the reaction is followed via thin layer chromatography of aliquots of reaction mixture to determine when the 2',4''-diester starting compound is no longer present.

When it is desired to introduce a 3-hydrocarbonsulfonyl group (e.g., methanesulfonyl) into a 2',4''-diacylmegalalosamine (e.g., 2',4''-diacetylmegalalosamine) via this process, pyridine is conveniently used as solvent and a hydrocarbonsulfonyl chloride (e.g., methanesulfonyl chloride) as acylating reagent, and the reaction may be carried out at room temperature, although higher temperatures may be used if shorter reaction times are desired. Thus, when 2',4''-diacetylmegalalosamine in pyridine to which methanesulfonyl chloride has been added in greater than a molar excess, is allowed to stand at room temperature, there is obtained good yields of 2',4''-diacetyl-3-methanesulfonylmegalalosamine, a preferred compound of our invention.

When utilizing a 3-monoacylmegalalosamine (e.g., 3-propionylmegalalosamine) as starting compound in this process, the 2',4''-diacyl groups (e.g., 2',4''-diacetyl) may be introduced under reaction conditions similar to those described in the 2',4''-diacyl process aspect of my invention, i.e., at room temperature utilizing either an acid anhydride in pyridine, or an acid halide in acetone in the presence of solid sodium bicarbonate. Thus, for example, when 3-propionylmegalalosamine in pyridine to which has been added at least a 3-molar excess of acetic anhydride is left at room temperature for 16 hours, there is obtained 2',4''-diacetyl-3-propionylmegalalosamine. If an increased reaction rate is desired, higher temperatures, i.e., in the range of from 70° to about 115° C., may be employed.

3-ACYL PROCESS ASPECT OF THE INVENTION

This process aspect of my invention provides a method for preparing the 3-mono-esters of my invention, i.e., the 3-acylmegalalosamines of Formula I wherein $R_1$ is acyl and $R_2$ is hydrogen, which comprises subjecting a 3,2',4''-triacylmegalalosamine to mild hydrolysis whereby the ester functions at C-2' and at C-4'' (which are less hindered and more reactive than the ester group at C-3) are hydrolyzed and there is formed a 3-monoacylmegalalosamine of this invention.

Contemplated as included within the term mild hydrolysis are reactions utilizing as hydrolyzing agents alcohols alone, e.g., methanol and ethanol, alcohols in the presence of an acid catalyst, e.g., p-toluenesulfonic acid, or aqueous alcoholic solutions. Additionally, aqueous alcoholic solutions containing basic compounds such as sodium carbonate, sodium bicarbonate, and ammonia may be employed as well as acidic solutions containing inorganic and organic acids such as hydrochloric acid, sulfuric acid, phosphoric acid, acetic acid, formic acid, and the like.

The particular reaction conditions to be employed for each hydrolysis will vary depending upon the triester starting compound utilized and the hydrolysis reagent employed.

A convenient method of carrying out the physical embodiment of this process is to allow the 3,2',4''-triacylmegalalosamine, e.g., 3,2',4''-triacetylmegalalosamine, to remain in a methanolic-aqueous solution of potassium bicarbonate at 25° C. for about 66 hours. Upon isolation of the hydrolysis product thereby formed utilizing known techniques such as solvent extraction and chromatographic techniques, there is isolated in excellent yields the 3-monoacylmegalalosamine, e.g., 3-acetylmegalalosamine. The reaction time may be shortened by carrying out the reaction at reflux temperature, and monitoring aliquots of the reaction solution at intervals via thin layer chromatography and stopping the reaction when the chromatogram indicates that all the 3,2',4''-triester has been consumed. Other reaction conditions for carrying out the hydrolysis of this process aspect of my invention are outlined in a table in Example 13 herein.

3-TETRAHYDROPYRANYL PROCESS ASPECT OF THE INVENTION

This process aspect of this invention provides a method of preparing the 3-tetrahydropyranyl-2',4''-diacylmegalalosamines of Formula I wherein $R_1$ is tetrahydropyranyl and $R_2$ is an acyl radical derived from an acid selected from the group consisting of a hydrocarbon carboxylic acid having up to 18 carbon atoms and a hydrocarbon sulfonic acid having up to seven carbon atoms, said method comprising treating a 2',4''-diaclymegalalosamine of this invention with dihydropyran in the presence of an acid catalyst, e.g., trifluoroacetic acid, benzenesulfonic acid, and, preferably, p-toluenesulfonic acid.

A convenient method of carrying out this process is to dissolve a 2',4''-diacylmegalalosamine, e.g., dibenzoylmegalalosamine, in dihydropyran to which is added a few drops of p-toluenesulfonic acid, and heating the reaction solution on a steam bath (70°–100° C.) until a thin layer chromatogram of an aliquot of reaction mixture indicates that the 2',4''present.

In addition to the process aspects described hereinabove, other methods of esterifying megalalosamine to form 2',4''-diacyl-and 3,2',4''-triacyl derivatives of Formula I may be used, for example, esterifications under acidic conditions, such as those utilizing a hydrocarbon carboxylic acid and trifluoroacetic acid as catalyst, or a hydrocarbon carboxylic acid and the anhydride thereof in the presence of a strong acid such as p-toluenesulfonic acid. Such esterification reactions are, however, less desirable than those carried out in basic media according to the process of this invention since they would cause side reactions, e.g., hydrolysis of one or more of the sugar groups, as well as esterification of the tertiary hydroxyl groups.

The following examples are given by way of illustration and are not to be construed as limitations of this invention, the scope of which is indicated by the appended claims.

EXAMPLE 1

Megalalosamine

A. Allow a solution of 2 g. of megalomicin A in 100 ml. of 0.75N hydrochloric acid to remain at 25° C. for 20 hours. Add solid sodium bicarbonate until the reaction mixture is slightly basic. Extract the aqueous solution with chloroform and dry the resultant extract over magnesium sulphate, filter and evaporate to a residue comprising 1.6 g. of megalalosamine. Purify by precipitation from benzene-hexane to get megalalosamine in the form of an amorphous white powder, m.p. 110°–125° C.; $C_{37}H_{68}N_2O_{12}$; m/e 732 [M$^+$], $[\alpha]_D^{25}$ −60.8° (EtOH); pKa 8.8; I.R.:$\nu_{max}$ (CCl$_4$) 3,450, 2,740, 1,730, 1,685, 1,170 cm.$^{-1}$ n.m.r.: δ (CDCl$_3$) 2.27, 2.40 ppm.

B. Alternatively the hydrolysis of megalomicin A to give megalalosamine may be effected under the reaction conditions outlined hereinbelow in Table 1:

| Concentration of acid | pH | Temperature | Time |
|---|---|---|---|
| 2N Hydrochloric acid | <0.1 | 25° | 24 hrs |
| 0.2N Hydrochloric acid | 0.80 | 25° | 24 hrs |
| 1N Sulfuric Acid | 0.45 | 25° | 24 hrs |
| 0.75N Hydrochloric acid | 0.15 | 98° | 6 hrs |

C. In the procedure of Example 1A, in place of megalomicin A use as starting material one of the following: megalomicin B, megalomicin $C_1$ and megalomicin $C_2$. Isolate the resultant product in a manner similar to that described to give megalalosamine. Purify via preparative thin layer chromatography on Kieselgel using 40 percent methanol in chloroform as the eluant. Dissolve the desired band in acetone, then filter and evaporate the acetone solution to a residue comprising megalalosamine.

EXAMPLE 2

2',4''-Diacetylmegalalosamine

To a solution of 1 g. of megalalosamine in 30 ml. of dry pyridine add 3 ml. of acetic anhydride and allow the reaction mixture to stand at 25° C. for 16 hours. Add chloroform to the reaction mixture and extract the chloroform solution several times with water then dry over magnesium sulphate, filter and evaporate to a residue comprising 2',4''-diacetylmegalalosamine. Purify by preparative thin layer chromatography on Kieselgel using 25 percent methanol in chloroform as the eluant. Evaporate the eluate to a residue and crystallize the residue from carbon tetrachloride-hexane to give 0.7 g. of 2',4''-diacetylmegalalosamine as colorless prisms, m.p. 132°–140° C.; $C_{41}H_{72}N_2O_{14}$; m/e 816 [M$^+$]; $[\alpha]_D^{26}$ −62.7°; pKA 7.8; I.R.$\nu_{max}$ (CCl$_4$) 3,440, 2,740, 1,740, 1,725, 1,685, 1,235, 1,160 cm.$^{-1}$; n.m.r.:δ(CDCl$_3$) 2.08, 2.20, 2.28, 2.33 ppm.

EXAMPLE 3

2',4''-Dibenzoylmegalalosamine

To a solution of 2.5 g. of megalalosamine in 50 ml. of acetone in the presence of 1.5 g. solid sodium bicarbonate add 0.75 ml. of benzoyl chloride. Stir the reaction mixture at room temperature for 16 hours then filter and wash the residue with acetone. Stir the acetone filtrate and slowly add 175 ml. of 5 percent aqueous ammonium hydroxide. The 2',4''-dibenzoylmegalalosamine separates as an amorphous white solid. Purify via column chromatography on silica gel using 3 percent methanol in chloroform as the eluant. Combine the eluates and evaporate to a residue comprising 1.82 g. of 2',4''-dibenzoylmegalalosamine. Crystallize from hexane to yield 2',4''-dibenzoylmegalalosamine as colorless prisms, m.p. 221–224° C.; $C_{51}H_{76}N_2O_{14}$; m/e 940 [M$^+$]; $[\alpha]_D^{26}$ −32.1° (EtOH); pKa 7.3; I.R.:$\nu_{max}$ (CCl$_4$) 3,470, 2,770, 1,730, 1,720, 1,690, 1,270, 1,170, 712 cm.$^{-1}$; n.m.r.: δ (CDCl$_3$) 2.23, 2.33 ppm.

EXAMPLE 4

3,2',4''-Triacetylmegalalosamine

To a solution of 3 g. of megalalosamine in 50 ml. of dry pyridine add 6 ml. of acetic anhydride and heat the reaction mixture under reflux on a steam bath for 16 hours. Extract the reaction mixture with chloroform and wash the combined extracts with water then dry over magnesium sulphate, filter and evaporate to a residue comprising 3,2',4''-triacetylmegalalosamine. Purify by preparative thin layer chromatography on Kieselgel plates using 10 percent methanol in chloroform as eluant. Dissolve the desired band in acetone and evaporate the acetone solution to a residue comprising 0.76 g. of 3,2',4''-triacetylmegalalosamine. Purify further by precipitation from acetone-hexane to yield 3,2',4''-triacetylmegalalosamine as a colorless amorphous solid, m.p.– 115°–122° C.; $C_{43}H_{74}N_2O_{15}$; m/e 858 [M$^+$]; $[\alpha]_D^{26}$ −48.8° (EtOH); pKa 7.6; I.R.:$\nu_{max}$ (CCl$_4$) 3,430, 2,740, 1,740, 1,725, 1,685, 1,235, 1,160 cm.$^{-1}$; n.m.r.: δ (CDCl$_3$) 2.09, 2.11, 2.20, 2,28, 2.33 ppm.

EXAMPLE 5

3,2',4''-Tripropionylmegalalosamine

In a manner similar to that described in Example 4 treat 2 g. of megalalosamine in 25 ml. of dry pyridine with 10 ml. of propionic anhydride at reflux temperature for 16 hours. Isolate the resultant product in a manner similar to that described by preparative thin layer chromatography on Kieselgel plates using 10 percent methanol in chloroform as the eluant to give 3,2'4''-tripropionylmegalalosamine. Further purify by precipitation from acetone-water to yield 1.5 gm. of 3,2',4''-tripropionylmegalalosamine as a colorless amorphous solid, m.p. 90°–98° C.; $C_{46}H_{80}N_2O_{15}$; m/e 900 [M$^+$]; $[\alpha]_D^{26}$ −45.5° (EtOH); I.R.: $\nu_{max}$ (CCl$_4$) 3,480, 2,780, 1,740, 1,690, 1,180, 1,165 cm.$^{-1}$; n.m.r.: δ (CDCl$_3$), 2.27, 2.32 ppm.

EXAMPLE 6

3,2',4''-Triisovalerylmegalalosamine

In a manner similar to that described in Example 4, treat 2 g. of megalalosamine in 30 ml. of dry pyridine with 12 ml. of isovaleric anhydride. Isolate the resultant product in a manner similar to that described to give 3,2',4''-triisovalerylmegalalosamine. Purify by precipitation from petrol (b.p. 30°–60 C.) to give 3,2',4''-triisovalerylmegalalosamine as a colorless amorphous solid, m.p. 125°–130° C. (dec.); $C_{52}H_{92}N_2O_{15}$; m/e 984 [M$^+$]; $[\alpha]_D^{26}$ −38.7° (EtOH); I.R.: $\nu_{max}$ (CCl$_4$) 3,480, 2,770, 1,740, 1,690, 1,180, 1,170 cm.$^{-1}$; n.m.r.: δ(CDCl$_3$), 2.23, 2.31 ppm.

EXAMPLE 7

2',4''-Diacetyl-3-Propionylmegalalosamine

A. To a solution of 2 g. of 2',4''-diacetylmegalalosamine in 20 ml. of dry pyridine add 4 ml. of propionic anhydride and heat the reaction mixture at reflux temperature on a steam bath for 16 hours. Pour the reaction mixture into ice water, extract with chloroform then dry the chloroform extracts over magnesium sulphate, filter and evaporate to a residue comprising 2',4''-diacetyl-3-propionylmegalalosamine. Purify via preparative thin layer chromatography on Kieselgel using 15 percent methanol in chloroform as the eluant. Dissolve the desired band in acetone, then evaporate the acetone to a residue comprising 0.1 g. of 2',4''-diacetyl-3-propionyl-megalalosamine. Purify further by precipitation from acetone-hexane to obtain 2',4''-diacetylmegalalosamine as a colorless amorphous solid, m.p. 139°–158° C. (dec.); $C_{44}H_{76}N_2O_{15}$; m/e 872 [M$^+$]; $[\alpha]_D^{26}$ −50.6° (EtOH); I.R.: $\nu_{max}$ (CCl$_4$) 3,480, 2,770, 1,740, 1,730, 1,690, 1,240, 1,170 cm.$^{-1}$; n.m.r.: δ (CDCl$_3$) 2.09, 2.20, 2.28, 2.40 ppm.

Alternate procedure: To 1 gm. of 3-propionyl-megalalosamine in 10 ml. dry pyridine add 2 ml. acetic anhydride. Allow the reaction mixture to stand at room temperature for 16 hours. In a manner similar to that described in Example 7A, isolate and purify the 2',4''-diacetyl-3-propionyl-megalalosamine thereby formed.

EXAMPLE 8

2',4''-Diacetyl-3-Isovalerylmegalalosamine

Megalalosamine 2',4''-Diacetate 3-Isovalerate

To a solution of 2 g. of 2',4''-diacetylmegalalosamine in 25 ml. of dry pyridine add 10 ml. isovaleric anhydride. Heat the mixture at reflux temperature on a steam bath for 198 hours. Pour the reaction mixture into ice water, extract with chloroform then dry the chloroform extract over magnesium sulfate, filter and evaporate to a residue comprising 2',4''-diacetyl-3-isovalerylmegalalosamine. Purify via preparative thin layer chromatography on Kieselgel using 15 percent methanol in chloroform as the eluant. Dissolve the desired band in acetone and evaporate the acetone to a residue comprising 0.11 g. of 2',4''-diacetyl-3-isovalerylmegalalosamine. Purify further by crystallization from acetone-hexane to obtain 2',4''-diacetyl-3-isovalerylmegalalosamine as a colorless amorphous solid, m.p. 90°–106° C.; $C_{46}H_{80}N_2O_{15}$; m/e 900 [M$^+$]; $[\alpha]_D^{26}$ −46.4° (EtOH); I.R.:$\nu_{max}$ (CCl$_4$) 3,450, 2,770, 1,740, 1,730, 1,700, 1,235, 1,170 cm.$^{-1}$; n.m.r.: δ (CDCl$_3$) 2.08, 2.20, 2.29, 2.41 ppm.

EXAMPLE 9

2',4''-Diacetyl-3-Methanesulfonylmegalalosamine (Megalalosamine 2',4''-Diacetate 3-Methanesulfonate)

To a solution of 1.5 g. of 2',4''-diacetylmegalalosamine in 10 ml. of dry pyridine add 1 ml. of methanesulfonyl chloride. Allow the reaction mixture to remain at 25° C. for 16 hours. Dissolve the reaction mixture in chloroform, wash the chloroform solution with water, dry over magnesium sulphate, filter and evaporate to a residue comprising 2',4''-diacetyl-3-methanesulfonylmegalalosamine. Purify via thin layer chromatography on Kieselgel using 10 percent methanol in chloroform as eluant. Dissolve the desired band in acetone and evaporate the acetone to a residue comprising 0.92 g. of 2',4''3-methane-sulfonylmegalalosamine. Purify further by precipitation from benzene-hexane to give 2',4''-diacetyl-3-methanesulfonylmegalalosamine as a colorless amorphous solid, m.p. 140°–145°; $C_{42}H_{74}N_2O_{16}S$; $[\alpha]_D^{26}$ −44.1° (EtOH); pKa 7.5; I.R.:$\nu_{max}$ (CCl$_4$) 3,430, 2,740, 1,740, 1,725, 1,685, 1,335, 1,235, 1,170, 1,160 cm.$^{-1}$; nmr: δ (CDCl$_3$) 2.08, 2.19, 2.28, 2.32, 3.05 ppm.

EXAMPLE 10

2',4''-Dibenzoyl-3-Methanesulfonylmegalalosamine (Megalalosamine 2',4''-Dibenzoate 3-Methanesulfonate)

To a solution of 3.5 g. of 2',4''-dibenzoylmegalalosamine in 25 ml. of dry pyridine add 2.5 ml. of methanesulfonyl chloride. Allow the mixture to stand at 25° C. for 16 hours then pour into water and extract with chloroform. Dissolve the reaction mixture in chloroform then wash the chloroform solution with water, dry over magnesium sulphate, filter and evaporate to a residue comprising 2',4''-dibenzoyl-3-methanesulfonylmegalalosamine. Purify via chromatography on a silica gel column using 2 percent methanol in chloroform as the eluant. Distill the combined eluates to a residue comprising 2.1 g. of 2',4''-dibenzoyl-3-methanesulfonyl-megalalosamine as a colorless amorphous solid, m.p. 136°–139° C.; $C_{52}H_{78}N_2O_{16}S$; $[\alpha]_D^{26}$ −12.3° (EtOH); I.R.: $\nu_{max}$ (CCl$_4$) 3,440, 2,770, 1,740, 1,720, 1,690, 1,180, 711 cm.$^{-1}$; δ (CDCl$_3$) 2.26, 2.37, 2.82 ppm.

EXAMPLE 11

2',4''-Dibenzoyl-3-Tetrahydropyranylmegalalosamine

To a solution of 0.5 g. of 2',4''-dibenzoylmegalalosamine in 3 ml. of dihydropyran is added a few crystals of p-toluene-sulfonic acid and heat the reaction mixture on a steam bath for 11 days. Dilute the resulting solution to 3 ml. with chloroform and chromatograph the solution on Kieselgel plates using 8 percent methanol in chloroform as the eluant. Dissolve the desired band with acetone and evaporate the acetone solution to a residue comprising 120 mgs. of 2',4''-dibenzoyl-3-tetrahydropyranylmegalalosamine. Purify by precipitation from petrol (b.p. 30°–60° C.) to give 2',4''-dibenzoyl-3-tetrahydropyranylmegalalosamine as a colorless amorphous solid, m.p. 114°–120° C. (dec.); $C_{56}H\nu N_2O_{15}$; m/e 1,024 [M$^+$]; $[\alpha]_D^{26}$ −26.9° (EtOH); I.R.: $\nu_{max}$ (CCl$_4$) 3,480, 2,780, 1,740, 1,730, 1,690, 1,170 712 cm.$^{-1}$; n.m.r.: δ(CDCl$_3$) 2.28, 2.38 ppm.

EXAMPLE 12

2',4''-Dibenzoyl-3-Caproylmegalalosamine

To a solution of 0.5 g. of 2',4''-dibenzoylmegalalosamine in 15 ml. of acetone add 1.5 g. of solid sodium bicarbonate and 13 ml. of n-caproyl chloride. Heat the reaction mixture on a steam bath for 19 days. Filter the reaction mixture and wash the resultant residue with acetone. Evaporate the combined filtrate and acetone washes and triturate the resultant residue with petrol (b.p. 30°–60° C.) to obtain an amorphous colorless solid comprising 2', 4''-dibenzoyl-3-caproylmegalalosamine. Purify by preparative thin layer chromatography on Kieselgel using 8 percent methanol in chloroform as the eluant. Dissolve the desired band in acetone and evaporate the acetone solution to a residue comprising 6 mg. of 2',4''-dibenzoyl-3-caproylmegalalosamine. Purify further by precipitation from petrol (b.p. 30°–60° C.) to obtain 2',4''-dibenzoyl-3-caproyl-megalalosamine as a colorless amorphous solid, m.p. 114°–120° C. (dec.); $C_{57}H_{86}N_2O_{15}$; m/e 1,038 [M$^+$] I.R.: $\nu_{max}$ (CCl$_4$) 3,400, 2,780, 1,740, 1,690, 1,270, 1,170, 710 cm.$^{-1}$.

EXAMPLE 13

3-Acetylmegalalosamine

A. Add 100 mg. of 3,2',4''-triacetylmegalalosamine to 3 ml. of a solution consisting of 8 parts methanol, 2 parts 1N aqueous potassium bicarbonate and 2 parts water. Allow the mixture to remain at 25° C. for 36 hours. Distill the solvents from the reaction solution and extract the resultant residue with chloroform. Filter the chloroform solution and evaporate to a residue comprising 3-acetylmegalalosamine. Purify by preparative thin layer chromatography on Kieselgel using 25 percent methanol in chloroform as the eluant. Dissolve the desired band in acetone and evaporate the acetone to a residue comprising 26 mg. of 3-acetylmegalalosamine. Purify further by precipitation from carbon tetrachloride to obtain 3-acetylmegalalosamine as a colorless amorphous solid, m.p. 175°–179° C. (dec.); $C_{39}H_{70}N_2O_{13}$; m/e 774 [M$^+$]; $[\alpha]_D^{27}$ –46.0° (EtOH); pKA 8.6; I.R.: $\nu_{max}$ (CCl$_4$) 3,500, 2,770, 1,750, 1,730, 1,690, 1,235, 1,180 cm.$^{-1}$; n.m.r.: $\delta$(CDCl$_3$) 2.10, 2.28, 2.48 ppm.

B. Alternatively, 3,2',4''-triacetylmegalalosamine is hydrolyzed to 3-acetylmegalalosamine utilizing the reaction conditions set forth in Table 2 below and there will be effected complete conversion to 3-acetylmegalalosamine. In each instance isolate and purify the resultant product in a manner similar to that described in Example 13A to give 3-acetylmegalalosamine.

TABLE 2

| Reactants | Reaction Time | °C Temperature |
| --- | --- | --- |
| Methanol + trace p-toluenesulphonic acid | 7 days | 25° |
| Methanol: water: 8:2 | 24 hours | 60° |
| 10% Sodium carbonate in 50% methanol-water | 4 days | 25° |
| 10% Ammonia in methanol | 4 days | 25° |
| Methanol + trace p-toluenesulphonic acid | 16 hours | 60° |

C. Treat each of the following triesters with aqueous potassium bicarbonate in a manner similar to that described in Example 13A:
3,2',4''-tripropionylmegalalosamine,
3,2',4''-triisovalerylmegalalosamine,
2',4''-diacetyl-3-caproylmegalalosamine,
2',4''-diacetyl-3-tetrahydropyranylmegalalosamine.
Isolate and purify the resultant respective products in a manner similar to that described in Example 13A to obtain, respectively
3-propionylmegalalosamine,
3-isovalerylmegalalosamine,
3-caproylmegalalosamine,
3-tetrahydropyranylmegalalosamine.

EXAMPLE 14

3-Acetylmegalalosamine Dihydrochloride

To a solution of 10 mg. of 3-acetylmegalalosamine in 1.5 ml. of ether containing sufficient tetrahydrofuran to effect solution, add dropwise a solution of dry hydrogen chloride in tetrahydrofuran until no further precipitate forms. Filter the resultant precipitate and wash with ether-tetrahydrofuran to give 3 mg. of 3-acetylmegalalosamine dihydrochloride as colorless needles, m.p. 127°–128° C.; $C_{39}H_{70}N_2O_{13}\cdot2HCl$.

In similar manner treat each of 3-propionylmegalalosamine, 3-isovalerylmegalalosamine, 3-caproylmegalalosamine and 3-tetrahydropyranylmegalalosamine with dry hydrogen chloride in tetrahydrofuran. Isolate the resultant products in a manner similar to that described to obtain respectively,
3-propionylmegalalosamine dihydrochloride,
3-isovalerylmegalalosamine dihydrochloride,
3-caproylmegalalosamine dihydrochloride,
3-tetrahydropyranylmegalalosamine dihydrochloride.

EXAMPLE 15

3-Acetylmegalalosamine Ditartarate

To a solution of 10 mg. of 3-acetylmegalalosamine in 1.5 ml. of ether containing sufficient tetrahydrofuran to effect solution, add dropwise a solution of tartaric acid in tetrahydrofuran until no further precipitate forms. Evaporate the solution to dryness and wash the resultant residue with ether-tetrahydrofuran (1:1) to give 6 mg. of 3-acetylmegalalosamine ditartarate as a colorless amorphous solid, m.p.: softens at 164° C., melts at 179°–185° C. (dec.); $C_{39}H_{70}N_2O_{13}\cdot2C_4H_6O_6$.

EXAMPLE 16

3,2',4''-Tristearoylmegalalosamine

To a solution of 1.0 gm. of megalalosamine in 100 ml. of dioxane in the presence of 3.0 gm. sodium bicarbonate, add 10.0 gm. of stearoyl chloride. Stir the reaction mixture at reflux temperature for 19 days. Filter the reaction mixture and wash the resultant residue with dioxane. Evaporate the combined filtrate and acetone washes and triturate the resultant residue with petrol (b.p. 30°–60° C.) to obtain an amorphous solid comprising 3,2',4''-tristearoylmegalalosamine. Purify by preparative thin layer chromatography on Kieselgel using 10 percent methanol in chloroform. Dissolve the desired band in acetone and evaporate to a residue comprising 3,2',4''-tristearoylmegalalosamine.

EXAMPLE 17

3-Propionylmegalalosamine (Megalalosamine 3-Propionate)

To 1.2 gm. of 3,2',4''-tripropionylmegalalosamine add 60 ml. of a solution consisting of two parts methanol and one part 0.5 Normal aqueous sodium bicarbonate. Allow the mixture to remain at 25° C. for 64 hours and at 50° C. for an additional 24 hours. Evaporate the solution to a residue and extract the residue with chloroform. Filter the chloroform solution and distill the chloroform to a residue comprising 3-propionylmegalalosamine. Purify by preparative thin layer chromatography on Kieselgel (brand of silica gel) using 25 percent methanol in chlorofrom as the eluant. Dissolve the desired band in acetone and evaporate the acetone to a residue comprising 0.74 g. of 3-propionylmegalalosamine. Purify further by precipitation from acetone-hexane to obtain 3-propionylmegalalosamine as a colorless amorphous solid, m.p. 99°–102° C.; $C_{40}H_{72}N_2O_{13}$; m/e 788 [M$^+$]; $[\alpha]_D^{26}$ –48.5° (EtOH); pKa 8.4; I.R.: $\nu_{max}$ (CCl$_4$) 3,500, 2,800, 1,750, 1,730, 1,700, 1,180 cm.$^{-1}$, n.m.r.: $\delta$(CDCl$_3$) 2.29, 2.50 ppm.

In a manner similar to that described above, treat each of 3,2',4''-tristearoylmegalalosamine, 3,2'4''-tri-isovaleryl-megalalosamine and 2',4''-dibenzoyl-3-caproyl-megalalosamine with methanolic aqueous sodium bicarbonate and isolate and purify the resultant product in a manner similar to that described to obtain respectively, 3-stearoyl-megalalosamine, 3-isovalerylmegalalosamine, and 3-caproyl-megalalosamine.

I claim:
1. A marcrolide selected from the group consisting of megalalosamine, ester derivatives thereof, and pharmaceutically acceptable acid addition salts of the foregoing, said macrolide being a member selected from the group consisting of a compound having the following structural formula I:

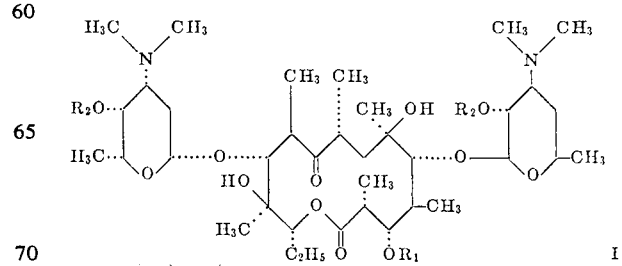

wherein R$_1$ is a member selected from the group consisting of hydrogen, tetrahydropyranyl, and an acyl radical of an acid selected from the group consisting of a hydrocarbon carboxylic acid having up to 18 carbon atoms and a hydrocarbon sulfonic acid having up to seven carbon atoms; and $R_2$ is a member selected from the group consisting of hydrogen and an acyl radical of an acid selected from the group consisting of a hydrocarbon carboxylic acid having up to 18 carbon atoms and a hydrocarbon sulfonic acid having up to seven carbon atoms; and the pharmaceutically acceptable salts of the foregoing compounds of structural Formula I.

2. A compound according to claim 1 wherein $R_1$ is a member selected from the group consisting of tetrahydropyranyl and an acyl radical of an acid selected from the group consisting of a hydrocarbon carboxylic acid having up to eight carbon atoms and a hydrocarbon sulfonic acid having up to seven carbon atoms; and $R_2$ is an acyl radical of a hydrocarbon carboxylic acid having up to eight carbon atoms.

3. A compound according to claim 2 wherein $R_1$ is propionyl.

4. A compound according to claim 1 wherein $R_1$ is an acyl radical of a hydrocarbon carboxylic acid having up to eight carbon atoms and $R_2$ is hydrogen.

5. A compound according to claim 1 wherein $R_1$ and $R_2$ are hydrogen, said compound being megalalosamine.

6. A compound according to claim 1 wherein $R_1$ and $R_2$ are propionyl, said compound being 3,2',4''-tripropionyl-megalalosamine.

7. A compound according to claim 1 wherein $R_1$ is propionyl and $R_2$ is hydrogen, said compound being 3-propionyl-megalalosamine.

8. A compound according to claim 1 wherein $R_1$ and $R_2$ are isovaleryl, said compound being 3,2',4''-tri-isovaleryl-megalalosamine.

9. A compound according to claim 1 wherein $R_1$ is tetrahydropyranyl and $R_2$ is benzoyl, said compound being 2',4''A-dibenzoyl-3-tetrahydropyranylmegalalosamine.

10. A compound according to claim 1 wherein $R_1$ is propionyl and $R_2$ is acetyl, said compound being 2',4''-diacetyl-3-propionylmegalalosamine.

11. A compound according to claim 1 wherein $R_1$ is isovaleryl and $R_2$ is acetyl, said compound being 2',4''-diacetyl-3-isovalerylmegalalosamine.

12. A compound according to claim 1 wherein $R_1$ is methanesulfonyl and $R_2$ is acetyl, said compound being 2',4''-diacetyl-3-methanesulfonylmegalalosamine.

13. A compound according to claim 1 wherein $R_1$ is methanesulfonyl and $R_2$ is benzoyl, said compound being 2',4''A-dibenzoyl-3-methanesulfonylmegalalosamine.

14. A compound according to claim 1 wherein $R_1$ is acetyl and $R_2$ is hydrogen, said compound being 3-acetyl-megalalosamine.

* * * * *

PO-1050
(5/69)

UNITED STATES PATENT OFFICE
CERTIFICATE OF CORRECTION

Patent No. 3,669,953                    Dated  June 13, 1972

Inventor(s)   Alan K. Mallams

It is certified that error appears in the above-identified patent and that said Letters Patent are hereby corrected as shown below:

Column 1, line 25, after "megalalosamine" and before "including" should be inserted ---as well as 3-tetrahydropyranyl-2',4"-diacylate esters of megalalosamine---. Column 2, line 48, "3,2',4",3" should read ---3,2',4"-triacyl-megalalosamines wherein the acyl group at C-3---. Column 4, lines 7-17 in formula I', the left-hand portion should appear as follows:

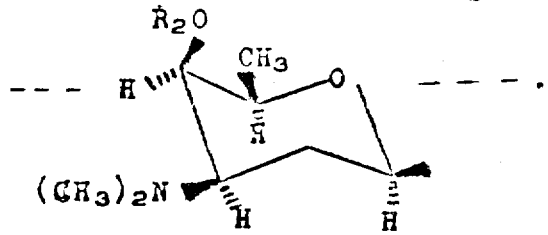

Column 12, line 69, "2',4" present" should read---2',4"-diacyl-megalalosamine starting compound is no longer present---.
Column 15, line 69, "2',4"3-methane-sulfonylmegalalosamine ." should read---2',4"-diacetyl-3-methanesulfonylmegalalosamine.---
Column 16, line 36, "$C_{56}H_VN_2O_{15}$" should read---
$C_{56}H_{84}N_2O_{15}$---. Column 18, line 35, "chlorofrom" should read---chloroform---. Column 20, line 9 in claim 9, "2',4" A-dibenzoyl-" should read---2',4"-dibenzoyl- ---. Column 20, line 22 in claim 13, "2',4" A-dibenzoyl-" should read---2',4"-dibenzoyl- ---.

Signed and sealed this 22nd day of May 1973.

(SEAL)
Attest:

EDWARD M.FLETCHER,JR.
Attesting Officer

ROBERT GOTTSCHALK
Commissioner of Patents